United States Patent [19]

Schotten et al.

[11] 4,179,377
[45] Dec. 18, 1979

[54] SHIFTING DEVICE FOR A PLATE FILTER PRESS

[75] Inventors: Alfons Schotten, Düren; Hermann J. Spölgen, Langerwehe, both of Fed. Rep. of Germany

[73] Assignee: Eberhard Hoesch & Söhne GmbH & Co., Düren, Fed. Rep. of Germany

[21] Appl. No.: 918,284

[22] Filed: Jun. 22, 1978

[30] Foreign Application Priority Data

Jun. 28, 1977 [DE] Fed. Rep. of Germany ....... 2728997

[51] Int. Cl.² .............................................. B01D 25/00
[52] U.S. Cl. .................................................... 210/230
[58] Field of Search ................................ 210/224, 230

[56] References Cited

U.S. PATENT DOCUMENTS

| | | | |
|---|---|---|---|
| 3,306,455 | 2/1967 | Lismer | 210/230 |
| 3,547,269 | 12/1970 | Kurita | 210/230 |
| 3,563,386 | 2/1971 | Kurita | 210/230 |
| 3,567,027 | 3/1971 | Kurita | 210/230 |
| 3,598,240 | 8/1971 | Abe | 210/230 |
| 3,624,778 | 11/1971 | Weber | 210/230 |
| 3,878,102 | 4/1975 | Busse | 210/230 |
| 3,915,863 | 10/1975 | Busse et al. | 210/230 |
| 4,105,560 | 8/1978 | Lismer | 210/230 |

FOREIGN PATENT DOCUMENTS

1422265  1/1976  United Kingdom .................... 210/230

*Primary Examiner*—Theodore A. Granger
*Attorney, Agent, or Firm*—Spencer & Kaye

[57] ABSTRACT

A plate filter press has a horizontal guide carrier; a plurality of filter plates shiftably supported on the guide carrier; a projection affixed to each filter plate; and a filter plate shifting device which includes a carrier element supported for displacement parallel to the guide carrier; a drive for moving the carrier element back and forth; as well as a shifting element and a reversing element mounted on the carrier element and arranged for engaging the projection of the filter plate to be shifted. The shifting element and the reversing element each are single-armed levers pivotally secured to the carrier element. The levers have respective free ends oriented towards one another. A bell crank lever is pivotally mounted on the free end of the reversing lever. One end of the bell crank lever is in abutting engagement with the projection of the filter plate to be shifted and the second end extends over the free end of the shifting lever and engages the same when the drive moves the carrier element in a filter plate-closing direction. The free end of the shifting lever abuts the projection of the filter plate to be shifted and moves the same when the drive moves the carrier element in a filter plate-opening direction.

8 Claims, 9 Drawing Figures

SHIFTING DEVICE FOR A PLATE FILTER PRESS

BACKGROUND OF THE INVENTION

This invention relates to a plate filter press in which vertically oriented filter plates are horizontally displaceably supported on at least one guide carrier. Each filter plate is provided with at least one fixed projection. The plate filter press has a filter plate shifting device which includes a carrier element which, by means of a drive, is displaceable back and forth in the clearance between the filter plates. The shifting device has a shifting element as well as a reversing element which are both adapted to engage the fixed projection of the filter plate to be displaced from the closed position to the open position (that is, from the closed side to the open side of the filter press).

A plate filter press of the above-outlined type is known and is disclosed, for example, in British Pat. No. 1,422,265. Filter presses equipped with shifting devices of the above-outlined type for the filter plates are, as a rule, operationally reliable. It is, however, a significant disadvantage of the conventional shifting devices that they are of relatively tall construction. Because of the large spatial requirement of the shifting device in the reversing zone, it needs substantial free space and significantly hinders the accessibility of the filter press during discharge or maintenance.

It is a further disadvantage of the prior art structures that the shifting element is moved exclusively by spring force into its abutting relationship with the projection of the filter plate to be displaced so that after extended service, the operational reliability is likely to be adversely affected by soiling, corrosion, or the like.

In plate filter presses in which the individual filter plates are, in the closed state, locked to the adjoining filter plate with locking hooks, the release and shifting of the plates are effected directly with the intermediary of the locking hooks. In instances where after completion of the filtering process significant expansion forces are generated by the filter cakes, the locking hooks too, are exposed to significant corresponding stresses. Since these forces affect the locking hooks in the opening direction, the unlatching of the filter plates from one another has to be carried out under load. The frictional force exerted on the locking hooks thus additionally increases under the effect of the unlatching forces. Consequently, the locking hooks, the release pawls and particularly the springs associated with the respective shifting element of the shifting device have to be of larger dimensions than it would be necessary based on normal force effects. In case of disadvantageous frictional coefficients associated with the interfaces participating in the unlatching operation, the pulling forces increases to such an extent that a secure unlatching cannot always be carried out, thus leading to damages to the entire apparatus.

While the above-outlined known plate filter press construction ensures in principle that an accidental opening of the filter plate stack is prevented, these structures have, however, the further disadvantage that subsequent to unlatching the respective filter plate to be shifted, the latter, because of the kinetic energy, cay by itself continue to move in the transporting direction even after the shifting device is stopped. This circumstance presents high safety risks for the operating personnel.

It is a further disadvantage of the last-named known structure that as the individual filter plate is transported, a disengagement from the shifting element of the shifting device has to occur before the filter plate moves into engagement with that plate which is already in the open position and with which the plate in motion is again to be interlocked. A satisfactory functioning of this motional sequence is therefore dependent from the kinetic energy of the filter plate and the frictional forces opposing the same. If, due to soiling or a premature unlatching of the plate from the shifting element of the shifting device, the frictional forces are greater than the kinetic energy of the plate, the latter will not arrive into engagement with the filter plate stack at the open side of the apparatus so that the intended locking of the filter plate to the filter plate stack at the open side cannot take place.

SUMMARY OF THE INVENTION

It is an object of the invention to provide an improved plate filter press of the above-outlined type from which the discussed disadvantages are eliminated and in which the operations required for the shifting of the filter plates are controlled automatically and in a positive manner.

This object and others to become apparent as the specification progresses, are accomplished by the invention, according to which, briefly stated, the plate filter press has a horizontal guide carrier; a plurality of filter plates shiftably supported on the guide carrier; a projection affixed to each filter plate; and a filter plate shifting device which includes a carrier element supported for displacement parallel to the guide carrier; a drive for moving the carrier element back and forth; as well as a shifting element and a reversing element mounted on the carrier element and arranged for engaging the projection of the filter plate to be shifted. The shifting element and the reversing element each are single-armed levers pivotally secured to the carrier element. The levers have respective free ends oriented towards one another. A bell crank lever is pivotally mounted on the free end of the reversing lever. One end of the bell crank lever is in abutting engagement with the projection of the filter plate to be shifted and the second end extends over the free end of the shifting lever and engages the same when the drive moves the carrier element in a filter plate-closing direction. The free end of the shifting lever abuts the projection of the filter plate to be shifted and moves the same when the drive moves the carrier element in a filter plate-opening direction.

It is an advantage of the invention that at the moment the reversing element arrives into engagement with the projection of the respective filter plate to be transported, the shifting element is positively brought into its transporting position by the bell crank lever and its function is thus not affected by any incidental circumstances such as friction, spring force or the like. The force exerted by the drive on the carrier element is utilized as the operating force for the actuation of the shifting element. This driving force is significantly greater than the force which could be exerted by an actuating spring arranged at the shifting element.

It is a further advantage of the invention that by virtue of the large force exerted positively on the shifting element, even in case of plate filter presses where the filter plates are locked to one another, the locking hooks can be securely released with the aid of the shifting element (shifting lever). The advantage resides particularly in that the release of the locking hook occurs when the filter plate stack is compressed in the closing direction by the reversing element, so that during opening of the locking hook only the spring force affecting the locking hook has to be overcome.

While in principle it is possible to bring the reversing element or the shifting element or both into the operational position by gravity, that is, by virtue of their own weight, it is, according to a further feature of the invention, particularly advantageous to connect at least the reversing element with a spring member which exerts a force thereon in the direction of its abutting position.

In accordance with a further feature of the invention, that terminus of the bell crank lever which projects over the shifting element has a slot through which extends a pin affixed to the shifting element. This arrangement has the advantage that the three basic elements of the shifting device, that is, the reversing element, the bell crank lever and the shifting element are connected to one another in a form-locking manner so that the bell crank lever is securely held even if, for space-saving reasons, the reversing element and the shifting element engage the projection of the filter plate from below in an upward direction. In case of endless carrier elements such as a chain, the support and guidance thereof in the zone of deflection at the respective ends of the plate filter press is substantially improved.

In accordance with a further feature of the invention, the carrier element is formed by two horizontally spaced, parallel-arranged, adjacent endless roller chains and further, the shifting element and the reversing element are articulated to pins coupling the two chains to one another. It is an advantage of this arrangement that the entire shifting device has a small structural height, particularly in the zone of the shifting element and further, commercially available roller chains may be used as the carrier element. The required deflecting sprockets and drive sprockets are commercially available components as well so that the manufacture, stocking of spare parts and maintenance are significantly simplified. The use of roller chains has the further advantage that it ensures a precise and slip-free positioning of the reversing element and the shifting element. Further, the space provided between the two roller chains permits arranging these two elements essentially in a flat-lying position in a plane defined by the two roller chains so that these elements project only slightly beyond such plane.

In accordance with a further feature of the invention, a spring-biased locking hook and a locking pin are mounted on the projection of each filter plate and further, the shifting element is so dimensioned that it disengages the locking hook from the locking pin of the adjoining filter plate when the shifting element arrives into engagement with the projection. This arrangement has the advantage that the transporting forces of the shifting device affect the respective filter plates directly and not with the intermediary of the locking hooks and further, during the shifting of the individual filter plate, the latter is positively maintained between the shifting element and the reversing element and further, the locking hook is in a stress-free condition during its disengagement from the locking pin. The last-named advantage results from the fact that when the shifting step is introduced, the shifting device is moved until the reversing element arrives nto engagement with the respective filter plate to be transported and thus exerts a force which compresses the filter plates. In this manner then the locking hook is relieved of stresses so that as the bell crank lever exerts a force on the shifting element, essentially only the force of the closing spring of the locking hook has to be overcome to unlatch the locking hook. After unlatching the filter plate to be shifted and after the shifting device has reversed its direction, the filter plate is transported (shifted) in a conventional manner. The engagement and locking of the filter plate with the filter plate stack dwelling on the open side of the press are effected by transporting the filter plate by the shifting element until it lies against the filter plate stack on the open side and the locking hook of the previously shifted filter plate has latched behind the locking pin of the filter plate that has just arrived and which now constitutes the outermost filter plate of the interlocked filter plate stack on the open side.

In accordance with a further feature of the invention, a hydraulic motor with pressure-dependent reverse control is provided for the filter plate shifting device. This arrangement has the advantage that in addition to an automation of the opening process, the pressing force with which the respective filter plate to be transported is pressed against the filter plate stack by the reversing element or, as the case may be, the shifting element, can be predetermined by setting the reversing pressure so that in plate filter presses having mutually interlocking filter plates, a stress-free disengagement between the plates can be performed in each instance.

In accordance with a further feature of the invention, each locking hook is provided with a laterally projecting abutment and further, there is provided a push rod which extends along the entire length of the filter plate press and which is supported by at least two pivotal links on the machine frame. Upon actuation, the push rod is displaced parallel to itself and against the abutments of the locking hooks. This arrangement has the advantage that it is possible to unlatch the locking hooks of each filter plate simultaneously and independently from the shifting device and thus makes it possible to perform any desired displacement of the filter plates by manual force.

BRIEF DESCRIPTION OF THE DRAWINGS

FIG. 4 is a sectional view taken along line IV—IV of FIG. 3a.

DETAILED DESCRIPTION OF THE PREFERRED EMBODIMENTS

Figure 1:
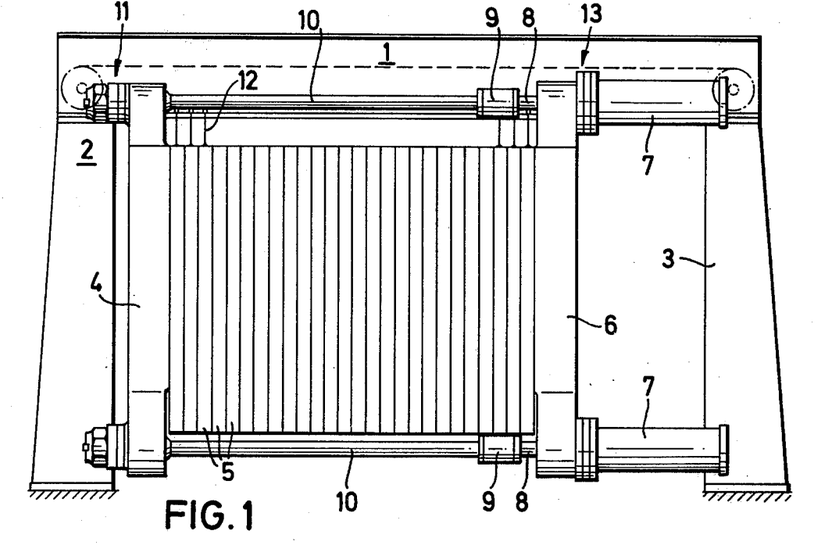
FIG. 1 is a schematic side elevational view of a plate filter press with overhead guide carrier, incorporating the invention.

Turning now to FIG. 1, the plate filter press shown therein has an overhead guide carrier 1 which is supported at its end by uprights 2 and 3 resting on the floor. The guide carrier may be, for example, an I-beam, at the lower flange of which there are suspended an end plate 4, a plurality of filter plates 5 as well as a head plate 6. The end plate 4 is stationarily secured to the guide carrier 1, while the head plate 6 is displaceable thereon. The filter plates 5 are connected with the flange of the guide carrier by means of suspensions 12 which permit a displacement of the individual filter plates during opening and closing of the plate filter press in the direction of its longitudinal axis.

Four hydraulic piston-and-cylinder units 7 are secured in the corner zones of the head plate 6. The piston rods 8 of each piston-and-cylinder unit are connected by means of a coupling 9 with respective pull rods 10 which are connected with the end plate 4 by means of spherical bearings 11. The power units 7 are, in a manner not shown in detail, connected to a supply of hydraulic medium by means of a hydraulic control so that during the filtering process, the filter plate stack formed of the plates 5 is compressed with the required closing pressure. The individual filter plates are firmly locked to one another by means of mechanisms to be described later, so that after completion of the filtering process, the head plate 6 can be displaced with the aid of the power cylinders 7 from the illustrated closed position to the open position without, at that time, causing an opening of the filter plate stack.

By means of a filter plate shifting device 13 which extends along the guide carrier 1 at the height of suspensions 12 (and which will be described in greater detail later), the filter plates 5 are, for the purpose of removing the filter cake or for washing and rinsing operations, individually and in succession moved in the direction of the head plate 6 which is already in the open position. Further, the shifting device 13 causes the filter plate, prior to its shifting towards the head plate 6 on the open side, to be unlocked from the adjoining filter plate of the filter plate stack on the closed side. As it will be also described in detail, each filter plate, after being shifted to the open side, is again locked to the adjoining filter plate on the open side at the moment the plate arrives into engagement with the filter plate stack that has been transported earlier, plate by plate, against the head plate 6 into the open position. Before starting the new filtering operation, the filter plates are, as a unit, displaced by means of the hydraulic power units 7 and with the intermediary of the head plate 6 towards the end plate 4 (which remains at all times on the closed side) and thereafter they are pressed with the required closing pressure against the end plate 4.

Figure 2:
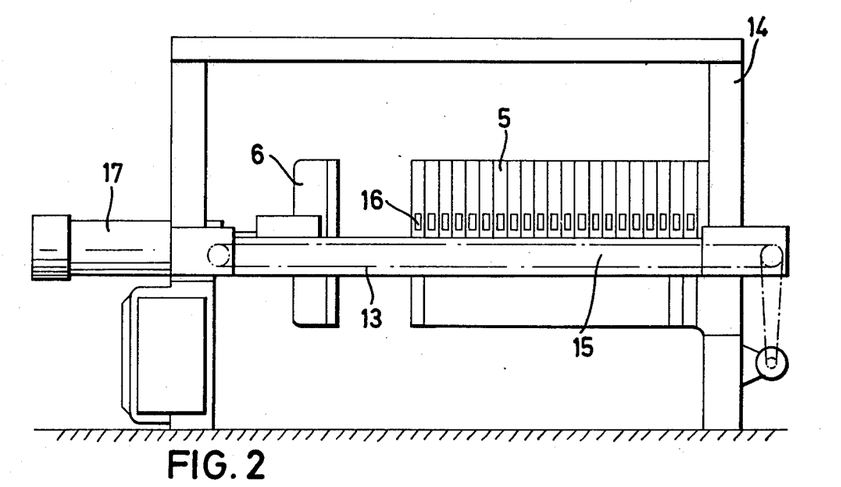
FIG. 2 is a schematic side elevational view of a plate filter press with lateral guide carriers, incorporating the invention.

In the plate filter press illustrated in FIG. 2, the press frame 14 is, on each side, provided with guide carriers 15 which support the filter plates 5 by means of laterally projecting extensions 16 affixed to each filter plate. A shifting device 13 is arranged parallel with each guide carrier bar 15. The closing of the filter plate press shown in FIG. 2 is effected by a single hydraulic power cylinder aligned with the longitudinal axis of the filter press. In other aspects the structure shown in FIG. 2 corresponds to the filter plate press shown in FIG. 1.

Figure 3A:
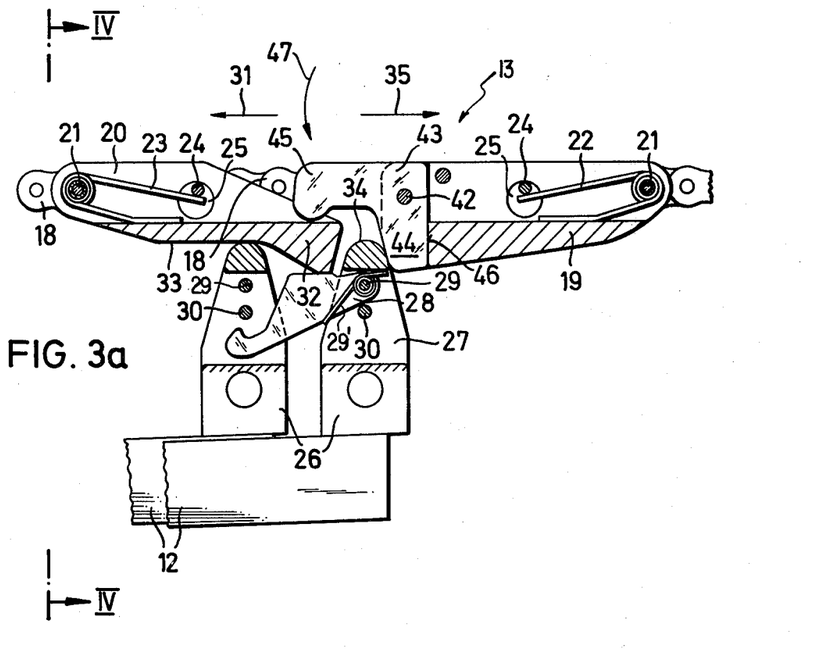
FIGS. 3a and 3b are sectional side elevational views of a preferred embodiment of the invention in two different operational positions.
Figure 3B:
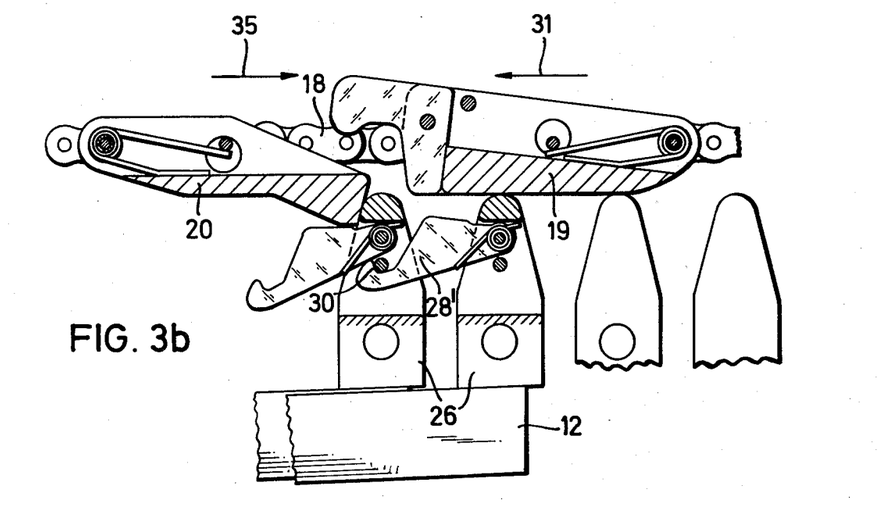
Figure 4:
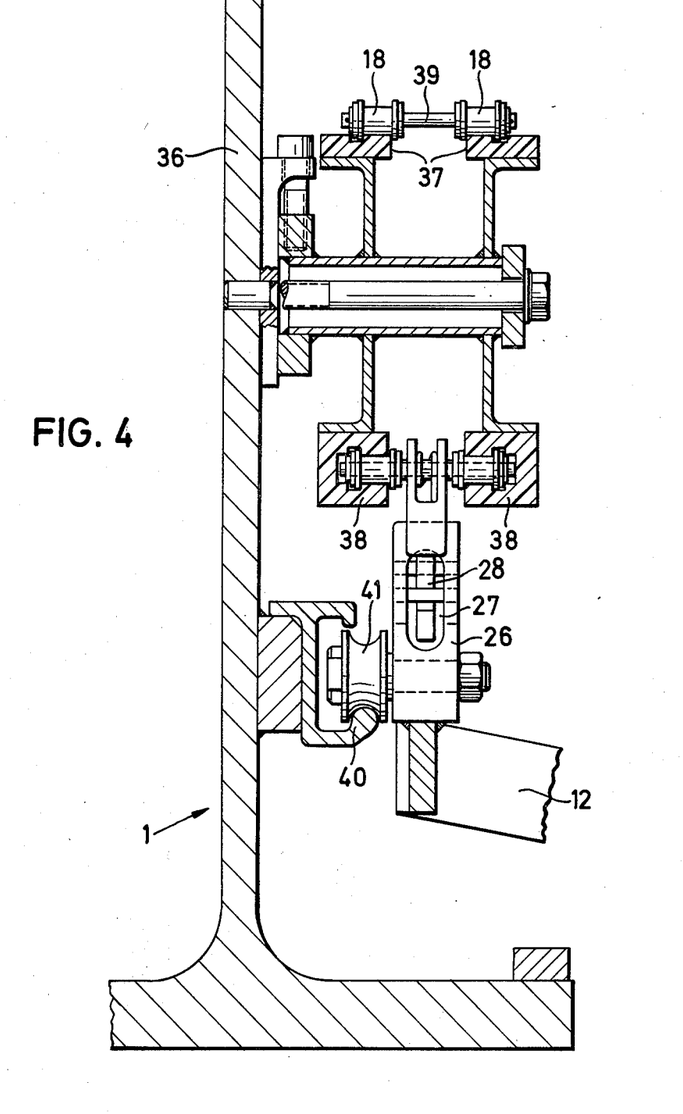

Turning now to FIGS. 3a, 3b and 4, there will be described a filter plate shifting device for a plate filter press of the type illustrated in FIG. 1. FIG. 3a illustrates the displacing device immediately upon commencement of a plate shifting operation, while FIG. 3b shows the individual elements at the moment in which the filter plate, upon completion of its displacement, is locked to the filter plate stack which is in the open position.

The carrier element of the shifting device is constituted by two parallel-spaced endless roller chains 18 to which there are articulated a lever 19 serving as a reversing element and a lever 20 serving as a shifting element. The free ends of the levers 19 and 20 are oriented towards one another. Both the reversing lever 19 and the shifting lever 20 are supported on respective pins 21 which connect the two roller chains 18 with one another. On the pivot pins 21 there are inserted respective leg springs 22 and 23, one leg of which is in engagement with a respective backup pin 24 connected with the roller chains 18 and the other leg of which is in engagement with the respective element 19 or 20 proper. Thus, the leg springs 22 and 23 urge the elements 19 and 20 away from the roller chains in the downward direction. An aperture 25 provided in the respective elements 19 and 20 in the zone of the pin 24 serves as a motion limiting abutment for the pivotal motion of the respective levers 19 and 20.

The suspensions 12 of the filter plates are each provided with a fixed projection 26 which tapers upwardly and which is provided with a window-like recess 27. In the recess 27 a bearing pin 29 pivotally supports a locking hook 28 which is connected to a leg spring 29' that biases the locking hook 28 clockwise (as viewed in FIG. 3a), that is, in the direction of the roller chains 18. To the projection 26, underneath the bearing pin 29, there is affixed a locking pin 30 which is situated in the window-like recess 27 and which is engageable by the locking hook of the adjoining filter plate on the side oriented towards the head plate 6.

The reversing lever 19 is so dimensioned in its length that it bridges at least two adjoining projections 26, as it may be observed in FIG. 3b. Thus, during the course of a motion of the chain 18 in the direction of the arrow 31, the reversing lever 19 may slide freely over the top of the projections 26 of the filter plates which are in the open position.

The shifting lever 20 has a downwardly oriented lug 32 which is so dimensioned that it may press the locking hook 28 downwardly to such an extent that it is released from the locking pin 30 cooperating therewith. The leg spring 23 of the shifting element 20 has a force which is sufficient to overcome increased frictional forces in the zone of the pin 21.

The approximately S-shaped outline of the guide face 33 of the shifting lever 20 provides that during its displacement with the chain 18 in the direction of the arrow 31, as the tip 34 of the projection 26 of the filter plate to be transported runs on the guide face 33, the shifting lever 20 is lifted by the cam action of the projection tip 34 to such an extent that the lug 32 may readily run over the tip 34 of the projection 26. As soon as the lug 32 has moved over the tip 34 of the projection 26, the shifting lever 20 is immediately pressed downwardly by the leg spring 23. At the moment when, under the effect of the drive of the roller chain 18, the reversing lever 19 is pressed against the upper end of the projection 26, a bell crank lever 43 articulated on a pin 42 at the end of the reversing lever 19 is pressed against the projection 26. The bell crank lever 43 is secured to the reversing lever 19 in such a manner that the pin 42 is arranged approximately in the zone of the tip of the bell crank lever angle. One free end 44 of the bell crank lever 43 is oriented towards the projection 26 of the filter plate whereas its other free end 45 extends over the free end of the shifting lever 20. The reversing lever 19 may be of forked construction at its free end to straddle the bell crank lever 43. At the reversing lever 19 there is formed an abutment 46 which cooperates with an edge of the free end 44 for limiting the pivotal motion of the bell crank lever 43 about the pin 42.

In the description which follows, one operational cycle of the above-described filter plate shifting device 13 will be explained. It is assumed that the head plate 6 is already in its open position and there has already been formed a filter plate stack at the open side of the press adjacent the head plate 6. During the course of one cycle, the shifting device 13 unlocks the outermost filter plate from the filter plate stack at the closed side of the press, shifts the filter plate from the closed side to the open side of the press into engagement with the outermost filter plate of the filter plate stack on the open side and locks these last-named two filter plates to one another.

When the cycle begins, the dual roller chain 18 is first moved in the direction of the arrow 31 (closing direction) and the free end 44 of the bell crank lever 43 engages the projection 26 of the filter plate to be shifted during the cycle. Under the effect of the force that drives the carrier chain 18, the bell crank lever 43 is pivoted in the direction of the arrow 47 to such an extent until it engages the abutment 46 of the reversing lever 19. At the same time, the free end 45 of the bell crank lever 43 presses from above on the shifting lever 20 so that the latter, as shown in FIG. 3a, moves downwardly in the free intermediate space between the two projections 26 of the two outermost filter plates of the filter plate stack. The lug 32 of the shifting lever 20 thus presses down on the locking hook 28 and seeks to move it counterclockwise about the pin 29 to thus disengage it from the locking pin 30 of the next-to-the-outermost filter plate in the filter plate stack at the closed side of the press. Normally, however, the filter cakes in the interlocked filter plate stack exert an appreciable expansion force which seeks to move the filter plates of the stack away from one another, thus placing a significant stress on the filter plate interlock which is constituted, between each filter plate of the stack, by the locking hook 28 and the cooperating locking pin 30. Thus, the downwardly pressing shifting lever 20 (urged downwardly by the reversing lever 19) would have to overcome a significant friction force derived from the stresses on the interlock. The shifting device 13, however, neutralizes the expansion force of the filter cakes since, as the shifting device 13 is moved in the direction of the arrow 31, the free end 44 of the bell crank lever 13 abuts the projection 26 of the outermost filter plate (which is to be shifted during the cycle) and thus compresses the filter plate stack. In this manner, the expansion forces of the cake are compensated and the stress from the interlock is removed. Consequently, the shifting lever 20 moves the locking hook 28 with ease into its disengaged state (that is, away from the locking pin 30 of the next-to-the-outermost filter plate), since the downwardly pressed shifting lever 20 needs to overcome only the closing force of the leg spring 29 of the locking hook 28.

Next, the drive of the roller chain 18 is reversed to now move the filter plate shifting device 13 in the direction of the arrow 35 (opening direction). Such a reversal of direction may be effected automatically by the drive of the shifting device. Thus, for this purpose, the drive may be constituted by a pressure-responsive reversible hydraulic motor which reverses its direction of rotation in response to the increased reaction force in the hydraulic system as the reversing lever 19, carried by the chain 18 in the direction of the arrow 31, compresses the filter plate stack as described above. As the roller chain 18 moves in the direction of the arrow 35, the shifting lever 20 is, by virtue of the force exerted thereon by the leg spring 23, held in its position shown in FIG. 3a. Then the leading edge of the lug 32 of the shifting lever 20 abuts the projection 26 of the outermost filter plate and thus, by means of a pushing force, shifts this filter plate in the direction of the arrow 35 towards the open side of the filter press.

During the entire displacement of the filter plate by the shifting device 13 in the direction of the arrow 35, the projection 26 of the traveling filter plate is locked between the free end of the two levers 19 and 20 so that in case of a sudden stop of the shifting device 13, the filter plate stops as well and thus cannot continue its travel by virtue of its kinetic energy.

Turning now to FIG. 3b, as soon as the filter plate, pushed by the shifting lever 20, arrives in the zone of the filter plate stack on the open side of the press, the reversing lever 19 is lifted by the filter plates which are already on the open side. The shifting lever 20, however, remains in its abutting engagement with the projection 26 of the filter plate that has just been shifted so that the latter, under the effect of the roller chain drive, is pressed against the filter plates, so that the hook 28' of the preceeding filter plate can latch behind the locking pin 30 of the filter plate which has just arrived.

Thereafter, the chain drive is again reversed (which may again be effected automatically based on the pressure increase in the drive system as the filter plate stack on the open side is compressed by the shifting lever 20), so that the roller chain is again moved in the direction of the arrow 31 to start a new plate shifting cycle.

Turning now to FIG. 4, on the web 36 of the guide carrier 1, there are provided a plurality of supports which are evenly distributed along the length of the carrier 1 and which support a pair of parallel-spaced horizontal upper tracks 37 and a pair of parallel-spaced horizontal lower tracks 38. The tracks 37 and 38 are components made of a synthetic material and have recesses in which the upper and lower flights of the two roller chains 18 are guided. The two roller chains are fixedly connected with one another by means of connecting pins 39. On the lower flight of the dual roller chain 18 there are arranged the shifting element 20 and the reversing element 19 in a manner described in connection with FIG. 3a.

A rail 40 is secured to the web 36 of the guide carrier 1 underneath the chain guide tracks 37 and 38. The filter plates 5 are individually suspended from the rail 40 by the respective suspensions 12 which include a roller 41 in engagement with the rail 40. The projection 26 is affixed to the upper end of the suspension 12.

Figure 5A:
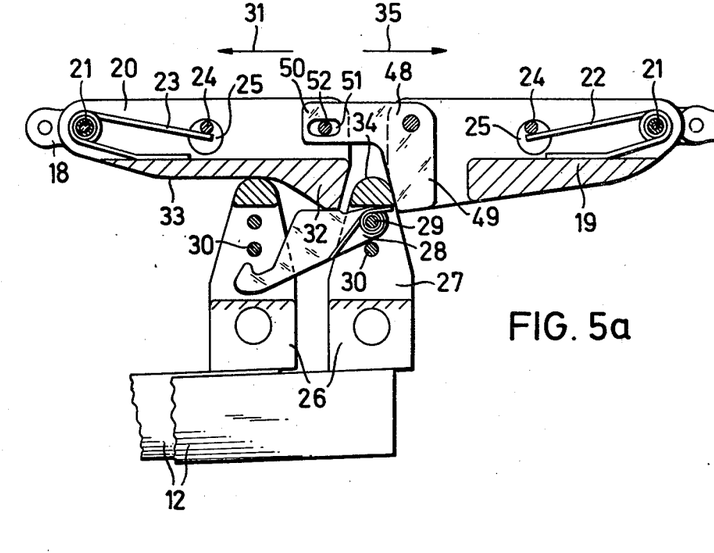
FIGS. 5a and 5b are sectional side elevational views of another preferred embodiment of the invention in two different operational positions.
Figure 5B:
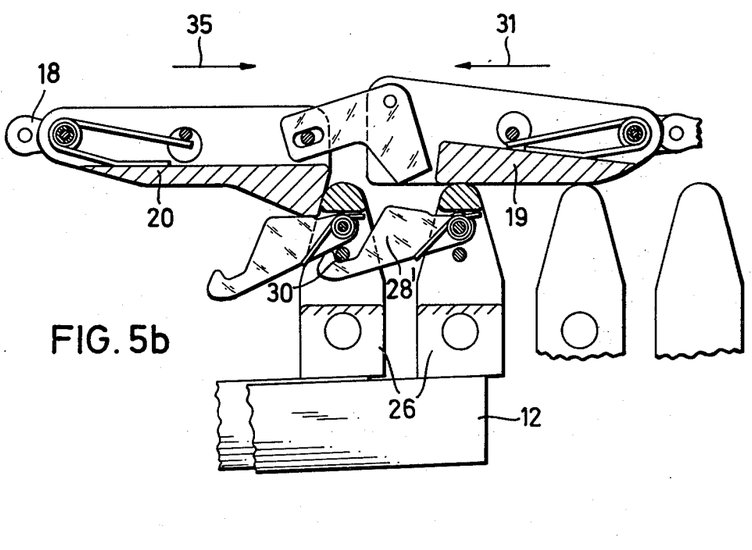

FIGS. 5a and 5b illustrate another preferred embodiment of the invention. In this embodiment, there is provided a bell crank lever 48 which is supported on the reversing lever 19 in a manner described in connection with the first embodiment.

Again, one free end 49 of the bell crank lever 48 serves to abut—as a stop forming part of the reversing lever 19—the projection 26 of the outermost filter plate to urge it in the closing direction. The other free end 50 extending over the shifting lever 20 is provided with a slot 51 through which extends a pin 52 fixedly secured to the shifting lever 20. In this manner, a force-transmitting arrangement is provided between the reversing lever 19 and the shifting lever 20, with the intermediary of the bell crank lever 48.

The mode of operation of the embodiment illustrated in FIGS. 5a and 5b corresponds to that shown in FIGS. 3a and 3b. The difference resides merely in that the force exerted by the bell crank lever 48 is transmitted to the shifting lever 20 by means of the pin-and-slot connection 51, 52. This embodiment, too, may be used for filter plate presses with or without locking hooks. The particular advantage resides in that upon deflecting the carrier chain 18 each time in the end zones of the plate filter press, the bell crank lever 48 is held by the pin-and-slot connection 51, 52 and subsequently is again automatically guided into its work position.

Both embodiments described above are intended for use as shifting devices in a plate filter press designed as shown in FIG. 1. In case the plate filter press is of a construction as illustrated in FIG. 2 (in which guide carriers 15 are provided on either side of the machine frame and the filter plates 5 are suspended from the guide carriers 15 by means of laterally extending projections 16), for reducing the structural height of the reversing lever 19 and the shifting lever 20, it is expedient to so mount these levers on the carrier element that they operate in an upward direction. In case the carrier element is an endless chain, it is expedient to secure the two levers 19 and 20 to the upper flight of the chain. This has the advantage that the entire guide for the carrier element is situated underneath the lateral projections 16 of the filter plates 5 so that the filter plates can be lifted out freely in an upward direction.

Figure 6A:
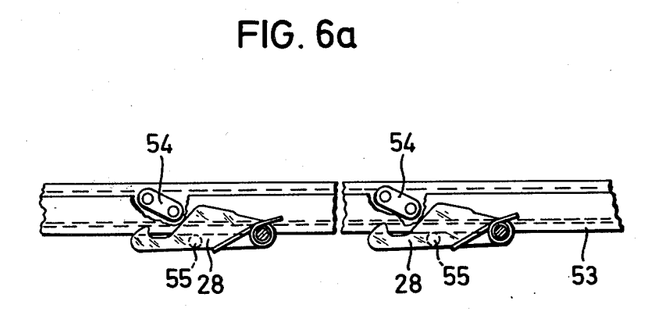
FIGS. 6a and 6b are schematic side elevational views of a further detail, shown in the inoperative and actuated positions, respectively.
Figure 6B:
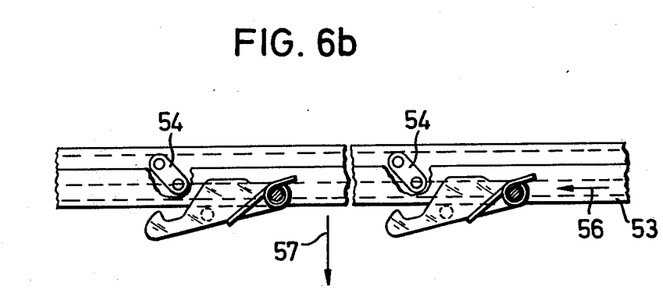

In order to ensure that the filter plate stack may be displaced manually independently from the shifting device—either into the work position (closed position) or into the open position—there is provided a central unlatching device schematically illustrated in FIGS. 6a and 6b. This device comprises a push rod 53 extending along the entire length of the plate filter press and supported on the machine frame by means of at least two pivotal links 54 articulated to the push rod 53. The locking hook 28 of each filter plate is provided with a laterally projecting pin 55 on which lies the push rod 53 as shown in FIG. 6a.

If now the push rod 53 is displaced in the direction of the arrow 56, it simultaneously shifts in the direction of the arrow 57 as a result of a clockwise pivotal motion of the links 54 and thus causes each locking hook 28 to pivot counterclockwise as it presses down on the respective pin 55 of each locking hook 28. Thus, the interlock of the filter plate stack is simultaneously dissolved so that the filter plates may be moved by manual force individually and independently from the shifting device.

While the roller chain, particularly if formed of two parallel-guided roller chain parts, constitutes a very advantageous carrier element for the reversing element and the shifting element, it is feasible to secure these elements to a carriage-like carrier element which can be moved by means of a single roller chain or a link chain, or other actuator.

It is to be understood that the above description of the present invention is susceptible to various modifications, changes and adaptations, and the same are intended to be comprehended within the meaning and range of equivalents of the appended claims.

What is claimed is:

1. In a plate filter press having a horizontal guide carrier; a plurality of filter plates shiftably supported on the guide carrier; a projection affixed to each filter plate; a spring-loaded pivotal locking hook and a locking pin mounted on each projection for releasably locking adjoining filter plates to one another to form an interlocked filter plate stack; and a filter plate shifting device for dissolving the stack on a closed side of the press by successively displacing the filter plates on the guide carrier in a first direction toward an open side of the press; the filter plate shifting device including a carrier element supported for displacement parallel to the guide carrier and driving means for selectively moving the carrier element in said first direction and in a second direction oriented opposite to said first direction; the improvement in said filter plate shifting device comprising (a) a shifting lever pivotally secured to said carrier element for swinging into and out of a depressed position, said shifting lever being oriented in said first direction and having a free end arranged to abut the projection of a filter plate to be shifted and moving the last-named filter plate in said first direction when said drive means moves said carrier element in said first direction;

(b) a reversing lever pivotally secured to said carrier element at a location spaced in said first direction from the articulation between said shifting lever and said carrier element; said reversing lever being oriented in said second direction and having a free end; the respective free ends of said shifting lever and said reversing lever being oriented towards one another; and (c) a bell crank lever pivotally mounted on the free end of said reversing lever and having a first end for cooperating with the projection of the filter plate to be shifted and a second end for cooperating with a portion of said shifting lever; said bell crank lever being arranged to abut, with said first end, the projection of the filter plate to be shifted, whereby the filter plate to be shifted is urged in said second direction and said bell crank lever is urged into an operative pivotal position depressing said shifting lever when said drive means moves said carrier element in said second direction for effecting a disengagement of the locking hook of the filter plate to be shifted from the cooperating locking pin of the adjoining filter plate.

2. A plate filter press as defined in claim 1, wherein said first end of said bell crank lever has a face portion which assumes an abutting relationship with a portion of said reversing lever when said bell crank lever is in its said operative pivotal position.

3. A plate filter press as defined in claim 1, further comprising a spring urging said reversing lever in the direction of the projection of the filter plate to be shifted.

4. A plate filter press as defined in claim 1, further comprising means defining a slot in said second end of said bell crank lever and a coupling pin affixed to the free end of said shifting lever and extending into said slot.

5. A plate filter press as defined in claim 1, wherein said carrier element comprises two horizontally spaced, parallel endless roller chains and first and second connecting pins coupling the two chains with one another; said shifting lever and said reversing lever being articulated to said first and second connecting pins, respectively.

6. A plate filter press as defined in claim 1, wherein said drive means comprises a hydraulic motor including pressure-responsive torque reversing means.

7. A plate filter press as defined in claim 1, further comprising a laterally extending abutment affixed to each locking hook; a push rod extending substantially in the entire length dimension of the plate filter press adjacent said abutments; and a plurality of pivotal links articulating said push rod to a machine frame; said push rod, upon its actuation in its length dimension cooperating simultaneously with each said abutment for simultaneously disengaging each locking hook from its respective locking pin independently from the operation of said shifting device.

8. In a plate filter press having a horizontal guide carrier; a plurality of filter plates shiftably supported on the guide carrier; a projection affixed to each filter plate; a spring-loaded pivotal locking hook and a locking pin mounted on each projection for releasably locking adjoining filter plates to one another to form an interlocked filter plate stack; and a filter plate shifting device for dissolving the stack on a closed side of the press by successively displacing the filter plates on the guide carrier in a first direction toward an open side of the press; the filter plate shifting device including a carrier element supported for displacement parallel to the guide carrier and driving means for selectively moving the carrier element in said first direction and in a second direction oriented opposite to said first direction; the improvement in said filter plate shifting device comprising (a) reversing means mounted on said carrier element for abutting the projection of a filter plate to be shifted and for urging it against an adjoining filter plate in said second direction when said drive means moves said carrier element in said second direction, whereby internal forces which are present upon conclusion of the filtering operation and which seek to separate the adjoining, interlocked filter plates are offset for relieving the locking hook and the cooperating locking pin of stresses derived from the internal forces;

(b) a locking hook disengaging means for moving the locking hook of the filter plate to be shifted to disengage the locking hook from the cooperating locking pin of the adjoining filter plate at the same time the locking hook and the cooperating locking pin are relieved of stresses by said reversing means; and (c) shifting means mounted on said carrier element for abutting the projection of the filter plate to be shifted and for shifting the filter plate in said first direction when said drive means moves said carrier element in said first direction, after disengagement of the locking hook from the cooperating locking pin by said locking hook disengaging means.

* * * * *